(12) United States Patent
Anderson et al.

(10) Patent No.: US 7,475,141 B1
(45) Date of Patent: Jan. 6, 2009

(54) DISTRIBUTED SERVICE LEVEL MANAGEMENT FOR NETWORK TRAFFIC

(75) Inventors: Thomas E. Anderson, Seattle, WA (US); Stefan R. Savage, Carlsbad, CA (US); David J. Wetherall, Seattle, WA (US)

(73) Assignee: Arbor Networks, Inc., Lexington, MA (US)

( * ) Notice: Subject to any disclaimer, the term of this patent is extended or adjusted under 35 U.S.C. 154(b) by 789 days.

(21) Appl. No.: 09/920,335

(22) Filed: Jul. 31, 2001

(51) Int. Cl.
 *G06F 15/173* (2006.01)
(52) U.S. Cl. .................................................. 709/226
(58) Field of Classification Search ................ 709/226, 709/238, 243, 200, 230, 229; 370/229, 232, 370/230
See application file for complete search history.

(56) References Cited

U.S. PATENT DOCUMENTS

| | | | |
|---|---|---|---|
| 5,390,184 A * | 2/1995 | Morris | 370/353 |
| 5,867,663 A * | 2/1999 | McClure et al. | 709/234 |
| 6,005,938 A | 12/1999 | Banker et al. | |
| 6,088,804 A | 7/2000 | Hill et al. | |
| 6,091,709 A * | 7/2000 | Harrison et al. | 370/235 |
| 6,256,317 B1 * | 7/2001 | Holloway et al. | 370/447 |
| 6,301,668 B1 | 10/2001 | Gleichauf et al. | |
| 6,314,475 B1 * | 11/2001 | Collin et al. | 710/15 |
| 6,480,495 B1 * | 11/2002 | Mauger et al. | 370/395.65 |
| 6,519,264 B1 * | 2/2003 | Carr et al. | 370/449 |
| 6,529,499 B1 * | 3/2003 | Doshi et al. | 370/352 |
| 6,681,232 B1 * | 1/2004 | Sistanizadeh et al. | 707/104.1 |
| 6,744,767 B1 * | 6/2004 | Chiu et al. | 370/395.21 |
| 6,745,246 B1 * | 6/2004 | Erimli et al. | 709/238 |
| 6,785,260 B1 * | 8/2004 | Goyal et al. | 370/351 |
| 6,839,321 B1 * | 1/2005 | Chiruvolu | 370/230.1 |
| 6,871,233 B1 * | 3/2005 | Bearden et al. | 709/226 |
| 7,009,987 B1 * | 3/2006 | Matsuzawa et al. | 370/409 |
| 2001/0042123 A1 * | 11/2001 | Moody et al. | 709/226 |
| 2002/0031142 A1 * | 3/2002 | Metin et al. | 370/463 |
| 2002/0176363 A1 * | 11/2002 | Durinovic-Johri et al. | 370/237 |
| 2003/0058797 A1 * | 3/2003 | Izmailov et al. | 370/238 |
| 2003/0202536 A1 * | 10/2003 | Foster et al. | 370/469 |

OTHER PUBLICATIONS

U.S. Appl. No. 60/287,075.*

* cited by examiner

*Primary Examiner*—Jason D Cardone
*Assistant Examiner*—Minh-Chau Nguyen
(74) *Attorney, Agent, or Firm*—Houston Eliseeva, LLP (57) ABSTRACT

One or more networking apparatuses are employed to practice a networking method that improves a first networking device's likelihood in meeting its service level goals/commitments for a first group of network traffic serviced by the first networking device. Determination is made, away from the networking device, on whether the first network device is meeting the service level goals/commitments for the first group of network traffic. Determination may include monitoring the first group of network traffic at or away from the networking device. If the service level goals/commitments are not being met, a second group of network traffic (also serviced by the first networking device) is regulated. Regulation may be made at the networking device or away from the network device. Additionally, if the condition for regulation is no longer presents, regulation may be moderated or removed. Further, the service level goals/commitments may include reliability and/or performance goals/commitments.

19 Claims, 10 Drawing Sheets

DISTRIBUTED SERVICE LEVEL MANAGEMENT FOR NETWORK TRAFFIC

BACKGROUND OF THE INVENTION

1. Field of the Invention

The present invention relates to the field of networking. More specifically, the present invention addresses the issue of managing service level goals or commitments for a group of network traffic serviced by a networking device (such as a "router").

2. Background Information

With advances in integrated circuit, microprocessor, networking and communication technologies, increasing numbers of devices, in particulars digital computing devices, are being networked together. Devices are often first coupled to a local area network, such as an Ethernet based office/home network. In turn the local area networks are interconnected together through wide area networks, such as ATM networks, Frame Relays, and the like. Of particular relevance is the TCP/IP based global inter-networks, Internet.

As a result of this trend of increased connectivity, increasing numbers of applications that are network dependent are being deployed. Examples of these network dependent applications include but are not limited to, email, net based telephony, world wide web and various types of e-commerce. For these applications, success inherently means high volume of network traffic for their implementing servers. To ensure continuing success, quality of service through orderly and efficient handling of the large volume of network traffic has become of paramount importance. Various subject matters, such as scalability, distributive deployment and caching of contents, as well as achieving and maintaining service level goals or commitments by networking devices have become of great interest.

The capabilities and capacity of a networking device are probably the primary factors in determining the networking device's ability to meet its service level goals/commitments, whether the goals/commitments are reliability or performance oriented. However, in a shared networked world, having plenty of capabilities and capacity in and of themselves does not automatically guarantee that the networking device will be able to meet its service level goals/commitments. Unexpected or unplanned surges/increases in "non-essential" or "superfluous" network traffic potentially could cause congestion, and adversely impacts the networking device's ability to service the "essential" network traffic.

Various bandwidth reservations or priorities based schemes (attributed to individual packets or packet types and self-administered by the networking devices having the service level goal/commitments) are employed in the art to ensure that the appropriate service levels are provided. However, these schemes impose the burden on the networking device that is "struggling" to meet the service level goals/commitments, further compounding the problem. Moreover, the various schemes tend to be complex and difficult to implement. Thus, alternate approaches to enhancing the likelihood of a networking device's ability to meet its service level goals/commitments are desired.

SUMMARY OF THE INVENTION

One or more networking apparatuses are employed to practice a networking method that improves a networking device's likelihood in meeting its service level goals/commitments for a first group of network traffic serviced by the first networking device. Determination is made, away from the networking device, on whether the network device is meeting the service level goals/commitments for the first group of network traffic. Determination may include monitoring the first group of network traffic at or away from the networking device. If the service level goals/commitments are not being met, at least a second group of network traffic (also serviced by the first networking device) is selected for regulation. Regulation may be made at the networking device or away from the network device, at other nodes of the network.

Additionally, if the condition for regulation no longer presents, regulation may be moderated or removed. Further, the service level goals/commitments may include reliability and/or performance goals/commitments.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention provides a novel approach to distributively manage service level goals/commitments for a group of network traffic serviced by a networking device (such as a "router"). In the description to follow, various aspects of the present invention will be described. However, the present invention may be practiced with only some of the aspects described. For purposes of explanation, specific numbers, materials and configurations are set forth in order to provide a thorough understanding of the present invention. However, the present invention may be practiced without some of the specific details described. In other instances, well known features are omitted or simplified in order not to obscure the present invention.

Parts of the description will be presented in terms of operations performed by a processor based device, using terms such as requesting, reporting, determining, data, and the like, consistent with the manner commonly employed by those skilled in the art to convey the substance of their work to others skilled in the art. The "quantities" or the "objects" of the various operations take the form of electrical, magnetic, or optical signals capable of being stored, transferred, combined, and otherwise manipulated through mechanical and electrical components of the processor based device. The term processor includes microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The terms "router" and "route" are used throughout this application, in the claims as well as in the specification. The terms as used herein are intended to have a broader meaning than its normal plain meaning as understood by those ordinarily skilled in the networking art. They are intended to be genus terms that include the conventional routers and conventional routing, as well as all other variations of network trafficking, such as, switches or switching, gateways, hubs and the like. Thus, unless particularized, the terms are to be given this broader meaning.

Further, the description repeatedly uses the phrase "in one embodiment", which ordinarily does not refer to the same embodiment, although it may.

Overview

Figure 1:
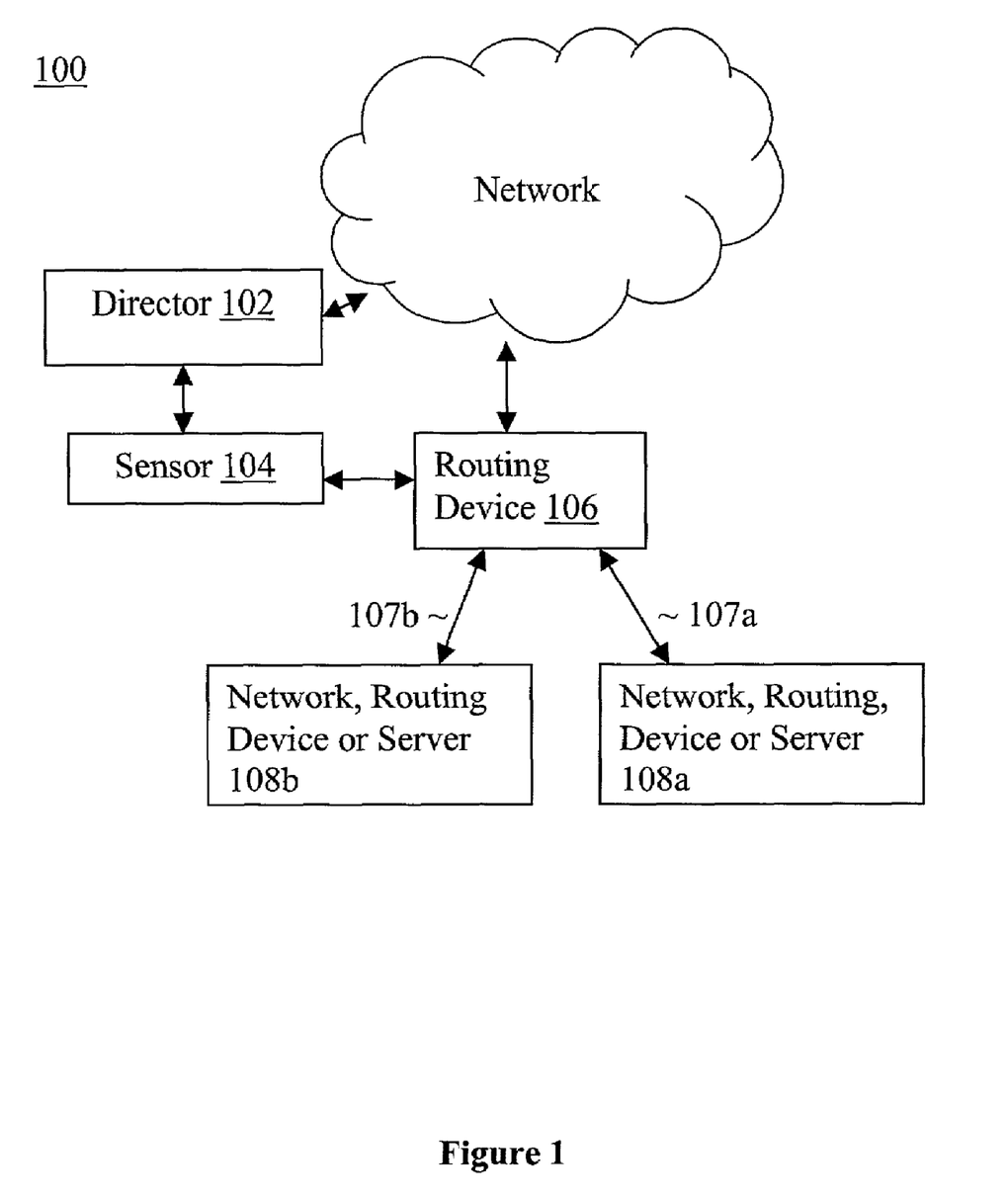
FIG. 1 illustrates a network view of the present invention, including a sensor function and a director function, in accordance with one embodiment.

Referring now first to FIG. 1, a block diagram illustrating a network view of the present invention, in accordance with one embodiment, is shown. As illustrated, in accordance with the present invention, network traffic is distributively managed for a networking device, such as routing device 106, to enable the networking device to meet the service level goal(s) or commitment(s) for a group of network traffic, such as network traffic 107a, serviced by the networking device. For the illustrated embodiment, network traffic is distributively managed employing director function 102, augmented with sensor function 104. More specifically, director function 102, assisted by sensor function 104, is employed to reduce the negative impact of other network traffics, such as network traffic 107b, on the ability of routing device 106 to meet its service level goals or commitments for network traffic 107a. Typically, although not necessarily, the other network traffics to be regulated are other network traffics also serviced by the networking device of interest.

The present invention contemplates that the service level goals/commitments may be one of a variety of reliability, performance as well as other service level goals/commitments of like kinds. The term "service level goals" as used herein generally refers to "self-imposed" desired service levels, whereas the term "service level commitments" generally refers to desired service level commitments made to "clients" of the networking devices of interest. For the purpose of practicing the present invention, the two terms are synonymous. In other words, as far as practicing the present invention, there are no substantive differences between distributively managing for service level goals versus managing for service level commitments. Accordingly, hereinafter, the two terms may be used interchangeably.

For the illustrated embodiment, network traffics 107a and 107b are destined for or sourced from destination/source 108a and 108b respectively. As illustrated, destination/source 108a and 108b may be a server, a routing device or a network of servers/networking devices. Moreover, for alternate embodiments, destination/source 108a and 108b may be the same destination/source. That is, network traffics 107a and 107b may be network traffics destined for the same destination node/network, but sourced from different clients of the destination node/network. In other words, network traffics may be managed for a beneficiary server, favoring one of its clients over other clients.

Briefly, director function 102 (assisted by sensor 104, for the illustrated embodiment) distributively determines, away from routing device 106, whether routing device 106 is meeting its service level goals/commitments for network traffic 107a. If not, other network traffics, such as network traffic 107b, are distributively identified (away from routing device 106) and regulated to assist routing device 106 in meeting its service level goals/commitments for network traffic 107a. Regulation of network traffics 107b may be applied at routing device 106 or other locations, i.e. networks nodes (not shown) of network 100.

In due course, director function 102 (assisted by sensor 104, for the illustrated embodiment) also distributively determines, away from routing device 106, whether the condition or conditions that cause the inability of routing device 106 to meet its service level goals/commitments for network traffics 107a are still present. If the condition or conditions are no longer present, director function 102 distributively determines, away from routing device 106, where in network 100 and by how much regulation should be moderated (i.e. deregulating previously imposed regulations).

Network 100 is intended to represent a broad range of private as well as public networks or interconnected networks, such as the enterprise network of a multi-national corporation, or the Internet. Except for the manner network traffics are distributively managed, networking nodes, such as, routing device 106, or 108a and 108b, or servers 108a-108b or "sub"-networks 108a-108b, are all intended to represent a broad range of network trafficking equipment/entities. In the case of routing devices 106 or 108a/108b, they may include but are not limited to conventional routers, switches, gateways, hubs and the like.

In one embodiment, director function 102 and sensor function 104 are implemented on one or more network management devices separate and distinct from routing device 106, as illustrated in FIG. 1. In alternate embodiments, director function 102 and sensor function 104 may be implemented on the same network management device, and the "network management" device may be routing device 106 itself (self-manage).

The coupling between the implementing device or devices of director and sensor functions 102 and 104 may be made using any one of a number of communication links known in the art, such as modem links over conventional phone lines, Digital Subscriber Lines (DSL), Integrated Service Digital Network (ISDN) connections, Asynchronous Transfer Mode (ASM) links, Frame Relay connections, and the like.

While for ease of understanding, only one director function 102, one sensor function 104, a router 106, and a handful each of network "nodes" 108a-108b are included in the illustration, from the description to follow, it will be readily apparent that the present invention may be practiced with more than one director function 102 as well as more or less network "nodes" 108a-108b, routing devices 106 and sensor functions 104. If more than one director function 102 is employed, typically when a larger number of sensor functions 104 are employed, each director function 102 may be assigned responsibility for a subset of the sensor functions employed. The director functions may relate to each other in a master/slave relationship, with one of the director functions serving as the "master" (and the others as "slaves"), or as peers to one another or organized into a hierarchy. Further, a sensor function may monitor multiple routing devices.

Figure 2:
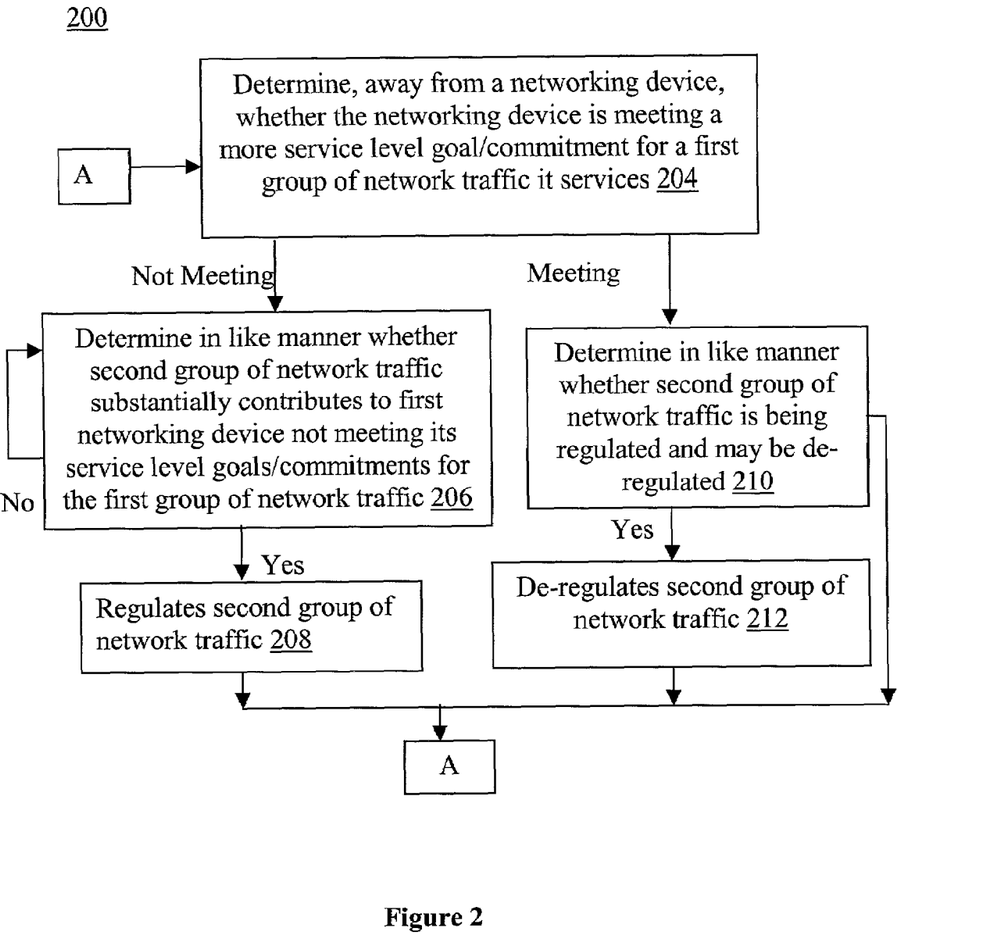
FIG. 2 illustrates a method view of the same invention, in accordance with one embodiment.

Having now provided an overview of the present invention, we further refer to FIG. 2, wherein a method view of the present invention, in accordance with one embodiment, is shown. As illustrated and alluded to earlier, the method starts with director function 102 determining (away from routing device 106) whether routing device 106 is meeting its service level goals/commitments for network traffic 107*a* (block 204). Upon determining the routing device 106 is not meeting its service level goals/commitments for network traffic 107*a*, director function 102 identifies (away from routing device 106) a group of other network traffic that substantially contributes to the inability of routing device 106 in meeting its service level goals/commitments (block 206). Upon identifying a group of other network traffic as a substantial contributor to the inability of routing device 106 in meeting its service level goals/commitments, director function 102 causes the identified other network traffic to be regulated accordingly (block 208). As described earlier, the regulations may be applied at routing device 106 or at other locations of network 100.

Back at block 204, if it is determined that routing device 106 is meeting its service level goals/commitments, director function 102 determines (away from routing device 106) whether at least one other group of network traffics is being regulated to assist routing device 106 in meeting its service level goals/commitments, and whether regulation may be moderated (block 210). Upon determining that regulation may be moderated, director function 102 determines the locations and amounts of de-regulations, and causes the de-regulation to be applied accordingly (block 212). As alluded to earlier, the de-regulations may be applied at routing device 106 or at other regulated locations of network 100.

Having now also described the method of the present invention at a high level, we now describe a number of the aforementioned aspects in further details. Still referring to FIGS. 1-2, as alluded to earlier and illustrated, sensor function 104 is employed to assist director function 102 in distributively managing network traffic for the benefit of routing device 106. More specifically, sensor function 104 is employed to monitor network traffic 107*b* as well as network 107*a*. That is, sensor function 104 is employed to monitor the network traffics that substantially contribute to the inability of routing device 106 in meeting its service level goals/commitments (network traffic 107*b*), as well the network traffic associated with the service level goals/commitments of interest (network traffic 107*a*). Of course, in alternate embodiments, network traffic may be monitored and reported by networking device 106 itself or with different sensors being employed.

For the illustrated embodiment, monitoring of network traffic 107*a* and 107*b* involves monitoring of various network traffic metrics for network traffic 107*a* and 107*b*. Typically, these network traffic metrics are at least partially indicative of whether routing device 106 is meeting its service level goals/commitments. For reliability goals/commitments, these network traffic metrics may include for example, packet drop rate. Similarly, for performance goals/commitments, these data may include for example, the volume of data being sent or transmitted, or the average turnaround time of the packets of network traffic 107*a*-107*b*.

Further, for the illustrated embodiment, monitoring of network traffic 107*a* and 107*b* are performed at routing device 106. However, in alternate embodiments, monitoring of network traffic 107*a* and 107*b* may be performed at other parts of network 100. For example, upon determining the "typical" sources and destinations of network traffic 107*a*-107*b*, sensor function 104 may perform the monitoring at the determined source and destination locations of the network 100 or routing devices near the determined source and destination locations (beside routing device 106, the intended beneficiary).

For the illustrated embodiment, the monitor data are provided periodically (e.g. on request) to director 102, which in turn performs its determination responsibilities based on the provided monitor data. However, in alternate embodiment, the monitor data may be provided continuously to director 102 instead.

Thus, for this embodiment, at block 204, director 102, in response to the receipt of the reported data, determines whether routing device 106 is meeting its service level goals/commitments for network traffic 107*a*. The determination, may be made, for example, by comparing the received metric data against a number of pre-provided corresponding thresholds for the data metrics. For the earlier mentioned example, data metrics such as packet drop rates, volume of data and average response time, the corresponding thresholds may be a maximum drop rate, a minimum amount of data, and a minimum average response time.

At block 206, for the illustrated embodiment, director function 102 determines if another group of network traffic, such as network traffic 107*b*, substantially contributes to the inability of routing device 106 in meeting its service level commitments, in accordance with configuration information pre-provided. In other words, director function 102 is pre-provided with the network traffic regulation candidates, and considers the candidates in order. In alternate embodiments, director function 102 may determine the candidates dynamically, e.g. by query routing device 106 for the "most active" network traffics.

Network traffics 107*b* may be considered as being substantially contributing to the inability of routing device 106 in meeting its service level goals/commitments for a variety of reasons. For example, network traffics 107*b* may be so considered because of the amount of bandwidth network traffics 107*b* consume.

At blocks 208 and 212, director function 102 causes regulations and de-regulations to be applied at networking device 106 or other selected locations of network 100. For the purpose of this application, regulation in general means moderating the amount of the network traffic to be regulated, whereas, de-regulation generally means relaxing the amount of moderation being applied to a particular group of network traffic.

At its extreme, regulation could include completely blocking off network traffic of the particular kind. Examples of regulation actions include but are not limited to limiting the bandwidth available for, or lowering the priority of network traffic to be regulated. Alternatively, a number of filters may also be applied to filter out the undesirable network traffic.

In its most fundamental form, de-regulation could simply involve resuming allowance of network traffic of the particular kind. Examples of moderation relaxation actions include but are not limited to the "inverses" of the regulation actions, i.e. expanding the bandwidth available for, or increasing the priority of the regulated network traffic. Examples of unblocking actions include but are not limited to cessation of filtering of the network traffic destined for or sourced out of the third party network node.

For the illustrated embodiment, at block 208, director function 102 selects networking device 106 itself for regulation. In alternate embodiments, director function 102 selects routing device that are "closest" to networking device 106, for regulation, and the regulation is iteratively and progressively extended outward, i.e. away from routing device 106. For de-regulation, for the illustrated embodiment, director function 102 again selects networking device 106 itself. For the alternate "progressive" regulation embodiment, director function 102 may de-regulate in "reverse" order, starting the deregulation from the "outermost" regulated routing device (away from networking device 106), and progressively retreat towards routing device 106.

Regulations and de-regulations may be applied and relaxed on an iterative basis also. That is, regulation may be initiated at a relatively "low" predetermined level, and gradually increased over time. Alternatively, regulation may be initiated at a relatively "high" predetermined level, and gradually decreased over time. Similarly, any de-regulation may be started with a relatively "small" amount, and increased over time.

For block 210, director function 102 may determine whether regulation may be relaxed by determining whether the conditions that caused network traffics 107b to be regulated remain present. If the conditions are no longer present, director function 102 determines where the regulation may be relaxed, e.g. at routing device 106, or other regulated locations in network 100, and additionally, the amount of deregulations at the selected de-regulation locations.

Note that under the present invention, regulation and de-regulation action such as bandwidth and priority regulations/de-regulations are dynamically determined and implemented, and no attribution of priority properties to the packets is necessary. In contrast, in the prior art, bandwidth reservations are pre-provisioned, and priorities are attributed to all packets. Further, priorities have be respected by all routers along the routing paths. Moreover, those skilled in the art will appreciate that the present invention is a superior approach, as the present invention is more flexible, works with a variety of routing capabilities, and generally, simpler to implement.

For the illustrated embodiment, director function 102 issues the regulation/de-regulation instructions to the applicable routing device 106 or others in network 100 via their corresponding sensor functions. That is, in the case of routing device 106, the regulation/de-regulation instructions are provided to routing device 106 via sensor function 104. Upon receipt of the instructions, applicable routing device 106 or others (or corresponding sensor function 104) causes the desired regulation/de-regulation actions to be applied to effectuate the desired regulation/de-regulation on the targeted network traffic. In alternate embodiments, regulations and de-regulation instructions may be provided to the regulated/de-regulated devices directly.

Sensors

Figure 3:
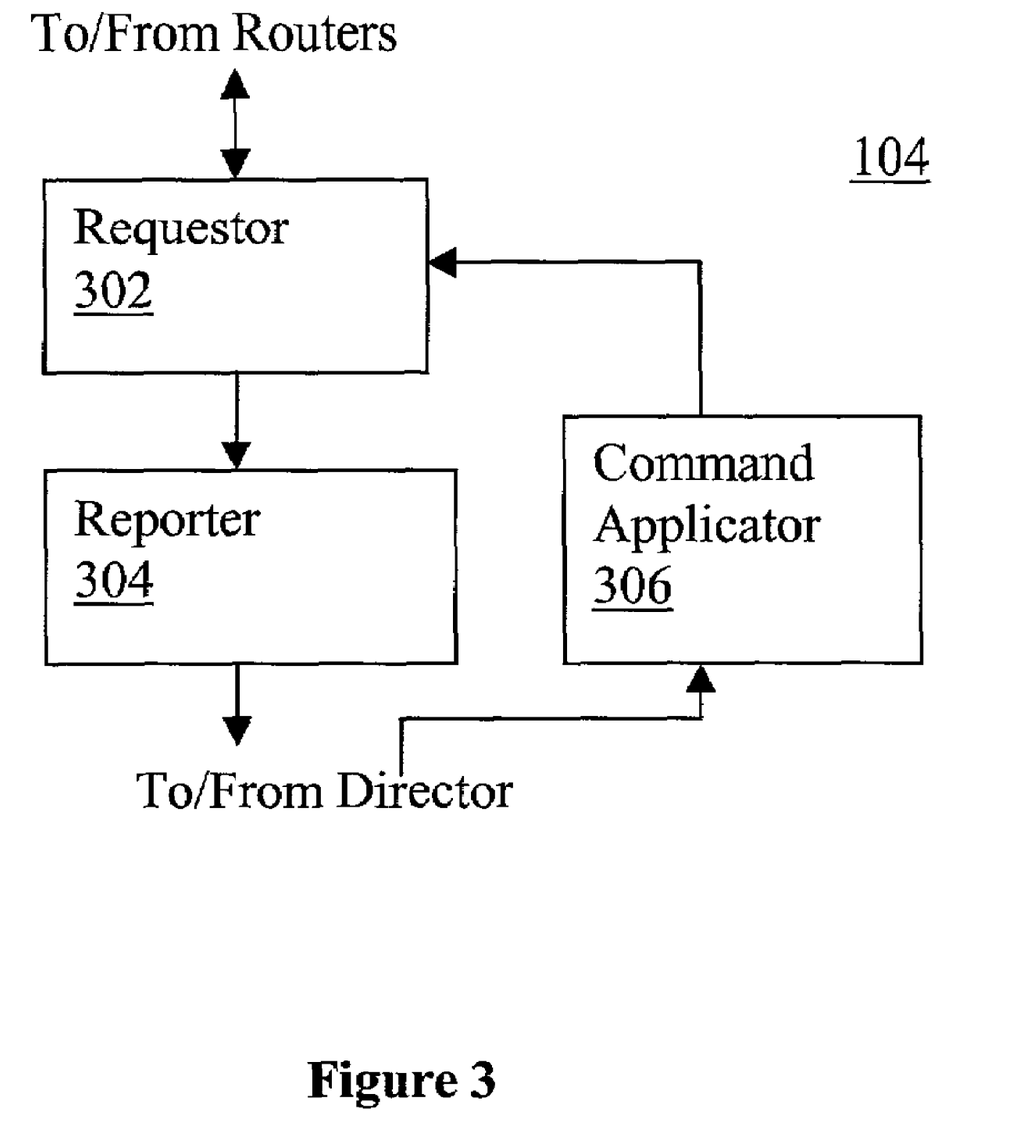
FIG. 3 illustrates a component view of the sensor function, in accordance with one embodiment.

FIG. 3 illustrates a component view of sensor function 104, in accordance with one embodiment. The embodiment assumes that sensor function 104 is implemented on an externally disposed device, outside of its responsible routing device or devices (hereinafter, simply router or routers). Moreover, the regulation and de-regulation commands are issued to the routers through their responsible sensor functions 104. As illustrated, sensor function 104 includes requestor function 302, reporter function 304 and command application function 306 operatively coupled to each other as shown. Requestor function 302 is used to request a router or routers for data depicting network traffic routed through the router/routers. The request/requests may be made periodically or on demand. The request/requests may be made using any one of a number of communication protocols known in the art. As alluded to earlier, examples of such data are network traffic statistical data. Requestor 302 is also used to request a router or routers to alter its/their routing operations to effectuate a desired regulation/de-regulation on the router/routers, with respect to network traffic being serviced. The routing operation altering request commands are typically made as a result of regulation/de-regulation instructions provided by director function 102. Similarly, the commands may be provided to the router/routers via any one of a number of communication protocols known in the art (e.g. defined by the router or other standard or proprietary protocol).

Reporter function 304 is used to report the gathered network traffic data. More specifically, reporter function 304 reports the gathered network traffic data to director function 102. For the illustrated embodiment, the reports are made periodically or on demand. The report may be made in any one of a number of formats, via any one of a number of communication protocols known in the art.

Command application function 306 applies the router specific commands responsive to the regulation/de-regulation instructions received from director function 102. The specific commands are router vendor dependent.

Figure 4:
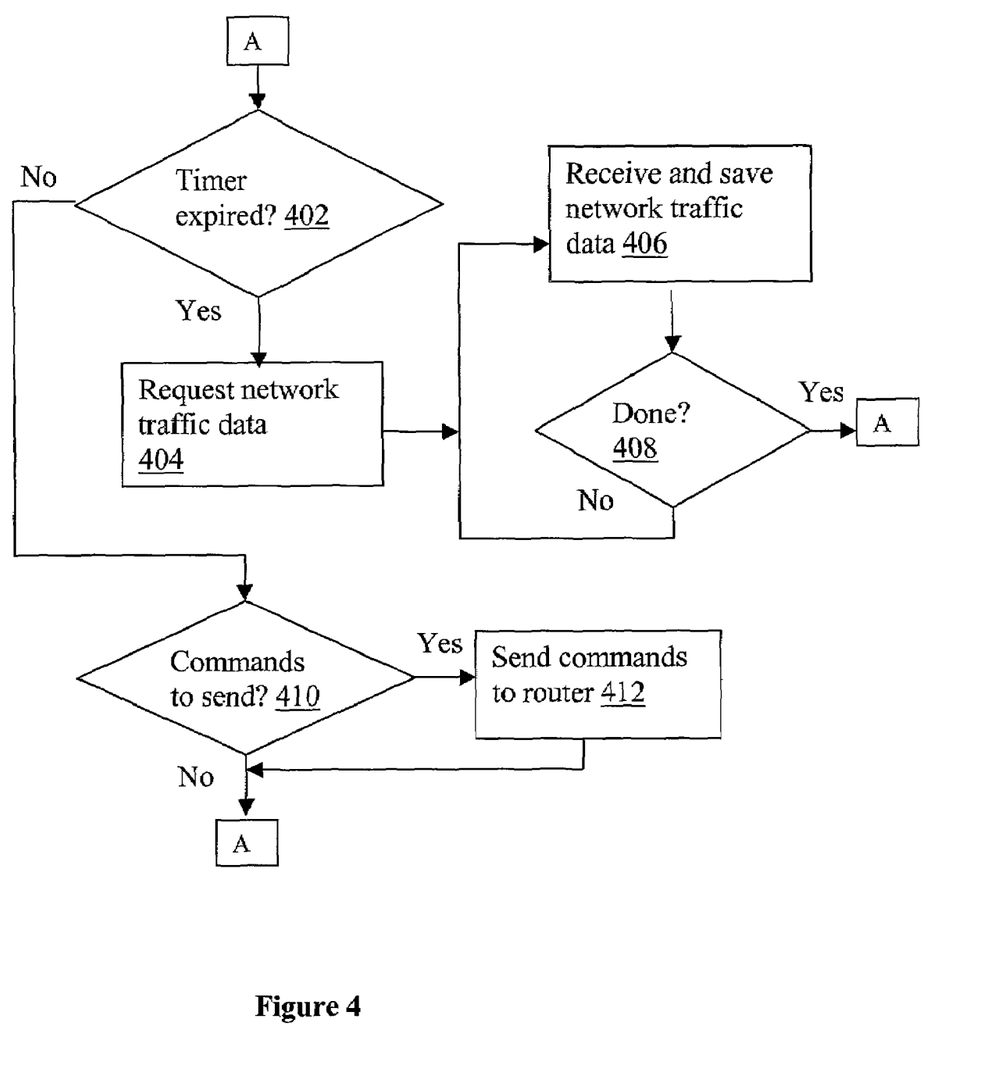
FIGS. 4-6 illustrate the operational flow of the relevant aspects of the requester, reporter and command application functions of FIG. 3, in accordance with one embodiment each.
Figure 5:
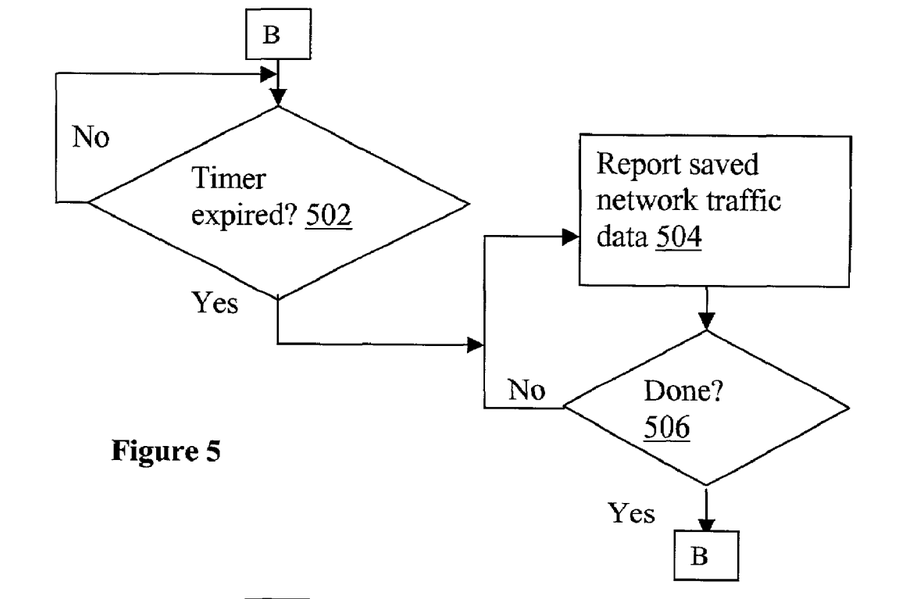
Figure 6:
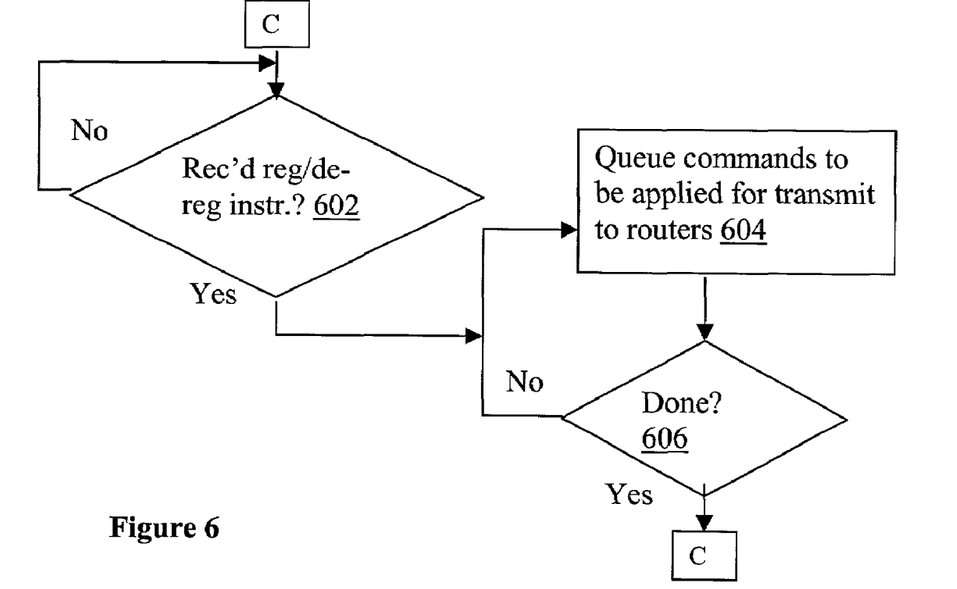

FIGS. 4-6 illustrate the operation flow of the relevant aspects of request function 302, report function 304 and command generation function 306, in accordance with one embodiment each. For request function 302, as illustrated in FIG. 4, upon start up, it awaits expiration of a timer, block 402. The periodicity of expiration is application dependent. Upon expiration of the timer, at block 404, request function 302 requests its responsible router/routers for network traffic data of the network traffics of interest. At blocks 406 and 408, request function 302 accumulates and saves the network traffic data provided. Upon completion of the data transfer, requestor function 302 returns to block 402. However, if timer has not expired, block 402, request function 302 determines if any regulation/de-regulation commands are to be sent to its responsible router/routers, block 410. If there are commands queued awaiting transmission to the router/routers, request function 302 dequeues and sends the commands to the router/routers accordingly, block 412. Upon sending the commands, request function 302 returns again to block 402.

For report function 304, as illustrated in FIG. 5, in like manner, upon start up, it awaits for the expiration of a timer, block 502. Likewise, the periodicity of expiration is application dependent. Upon expiration, i.e. time for reporting, report function 304, takes the most recently received and saved network traffic data, and sends them to director function 102, as earlier described, blocks 504-506. Upon transmission, report function 304 returns to block 502.

For command application function 306, as illustrated in FIG. 6, upon start up, it awaits for regulation/de-regulation instructions from director 102, block 602. Upon receipt of regulation/de-regulation instructions, command application function 306 generates the appropriate commands for the particular router/routers the sensor function is responsible, and queues the commands for transmission to the router/routers, as alluded to earlier. Upon generating and queuing the appropriate commands, generation function 306 returns to block 602 to await additional regulation/de-regulation instructions from director function 102.

Figure 7:
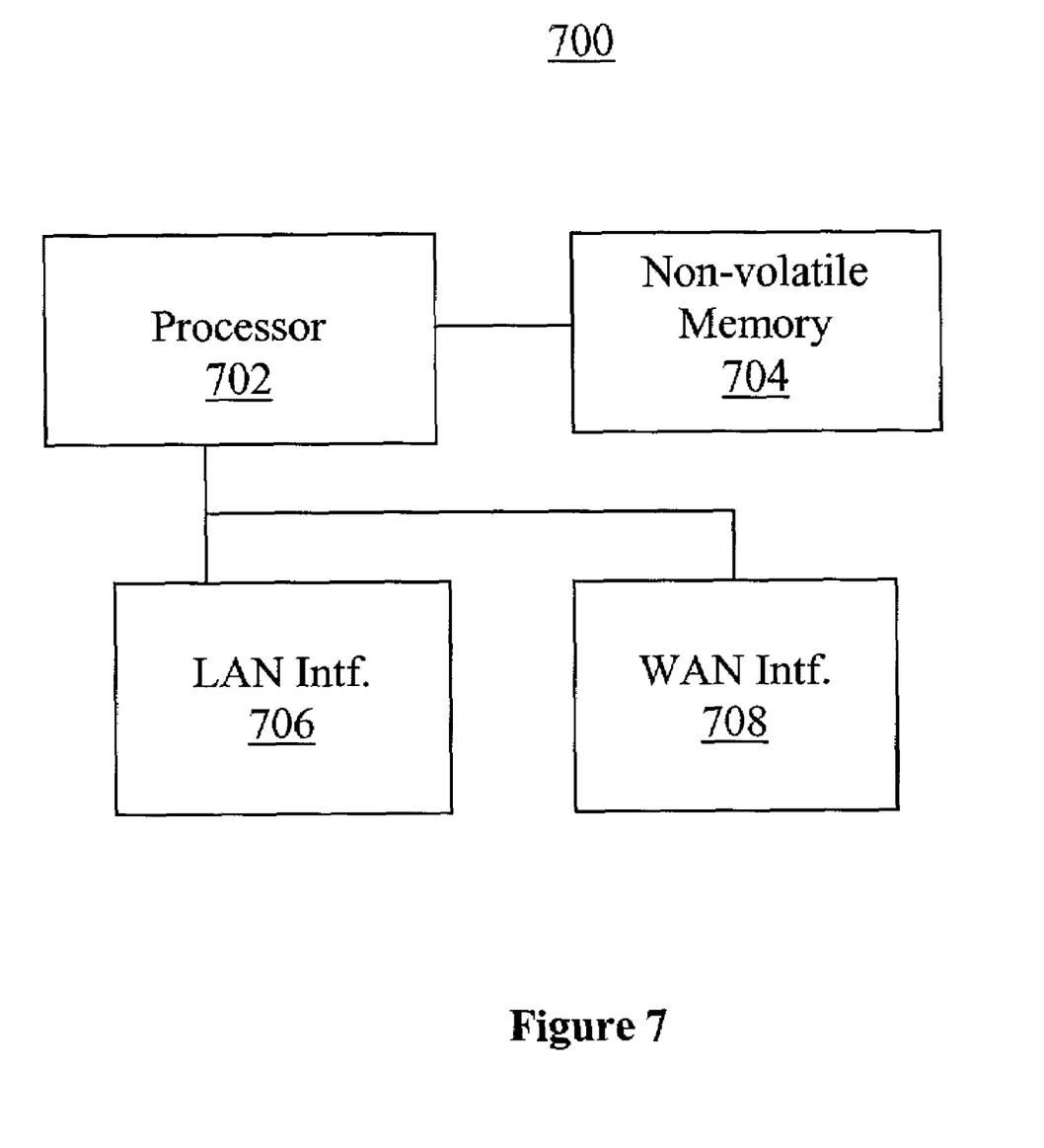
FIG. 7 illustrates an architectural view of a sensor, in accordance with one embodiment.

FIG. 7 illustrates an architectural view of a standalone sensor, implementing the earlier described sensor function 104, in accordance with a hardware/firmware implementation. As illustrated, sensor 700 includes processor 702, non-volatile memory 704, LAN and WAN interfaces 706 and 708. Processor 702 and non-volatile memory 704 are intended to represent a broad range of these elements known in the art. In the case of processor 702, it may be any 8-bit/16-bit microcontrollers, or 16-bit/32-bit digital signal processors, or even more powerful general purpose microprocessors known in the art. Non-volatile memory 704 may be EEPROM, Flash memory or other memory of the like. Non-volatile memory 704 is employed to store the firmware implementing the earlier described request, report and command generation functions of sensor 700, and for the embodiment, facilitates these functions execution in place. LAN interface 706 may be an Ethernet, Token Ring or other LAN interfaces of like kind. WAN interface 708 may be a modem, or an ISDN or DS3 adapter as well as other higher speed interfaces.

In an alternate embodiment, request, report and command application functions 302-306 of FIG. 3, may be implemented in software via high level languages such as C, and the software implementation may be hosted by a computing device near its responsible router/routers, provided the hosting computing device is properly equipped with the appropriate communication interfaces to communicate with its responsible router/routers, and director function 102.

In yet other embodiments, as alluded to earlier, request, report and command application functions 302-306 of FIG. 3, may be incorporated as an integral part of its responsible router. In these embodiments, instead of gathering the network traffic data via request/reply transaction conducted over a communication protocol, request function 302 may gather the network traffic data through bus transactions, such as direct memory access (DMA) operations accessing the appropriate internal storage units of the router for the collected data. Similarly, in lieu of applying commands designed for a command interface, command application functions may directly invoke the applicable router routines to cause the routing operation alteration to be effectuated instead.

Director

Figure 8:
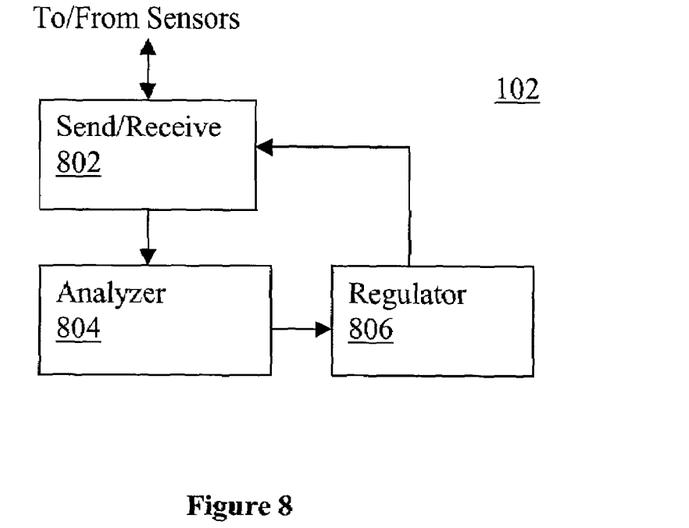
FIG. 8 illustrates a component view of a director function, in accordance with one embodiment.

Referring now to FIG. 8, wherein a component view of director function 102, in accordance with one embodiment is shown. As illustrated, director function 102 is also implemented on a standalone device outside of the monitored/regulated routers 106a-106b. Director function 102 includes send/receive function 802, analyzer 804, and regulator 806, operatively coupled to each other as shown. Send/receive function 802 is employed to receive network traffic data reported by sensor functions 104, and to send regulation/de-regulation instructions to the applicable sensor functions or the routers directly. Analyzer 804 analyzes the network traffic data reported to determine if the networking device of interest is meeting its service level goals/commitments, whether regulation/de-regulation actions need to be taken to regulate selected network traffics to enhance the likelihood of the networking device of interest being able to meet their service level goals/commitments, and alerts regulator 806 accordingly. In one embodiment, analyzer 804 determines whether the networking device of interest is meeting its service level goals/commitments, and whether a group of other network traffics are to be regulated/deregulated, based on the reported data, as described earlier. Regulator 806 is used to determine the location or locations of regulation/de-regulation (i.e. the routers), and what the regulation/de-regulation actions should be.

Figure 9:
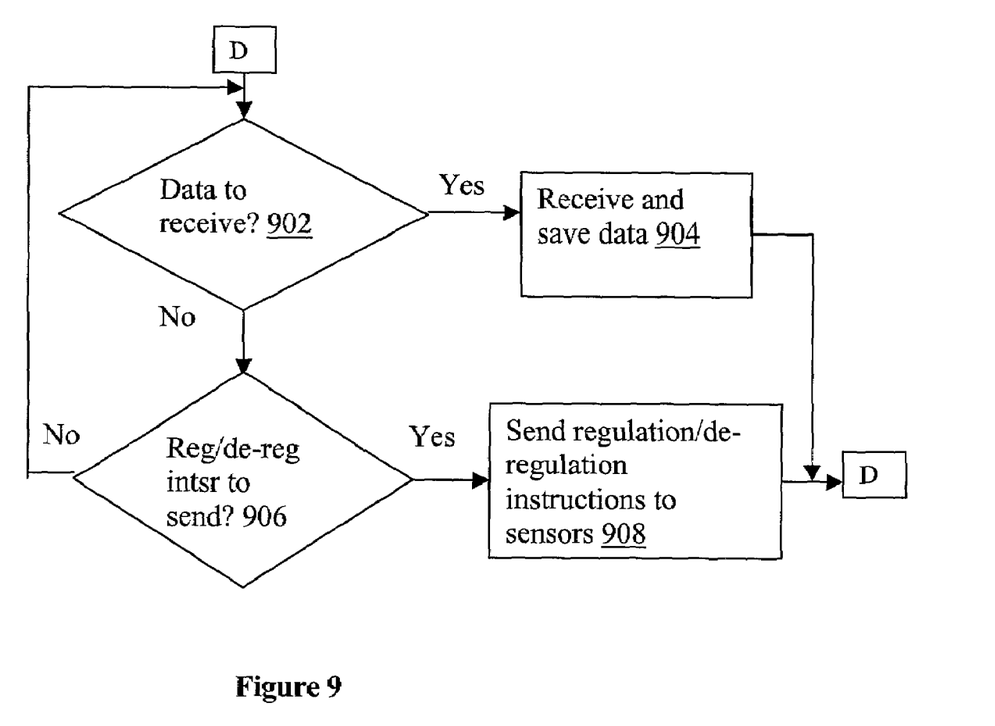
FIGS. 9-11 illustrate the operational flow of the relevant aspects of the send/receive, analyzer and regulator functions of FIG. 8, in accordance with one embodiment each.
Figure 10:
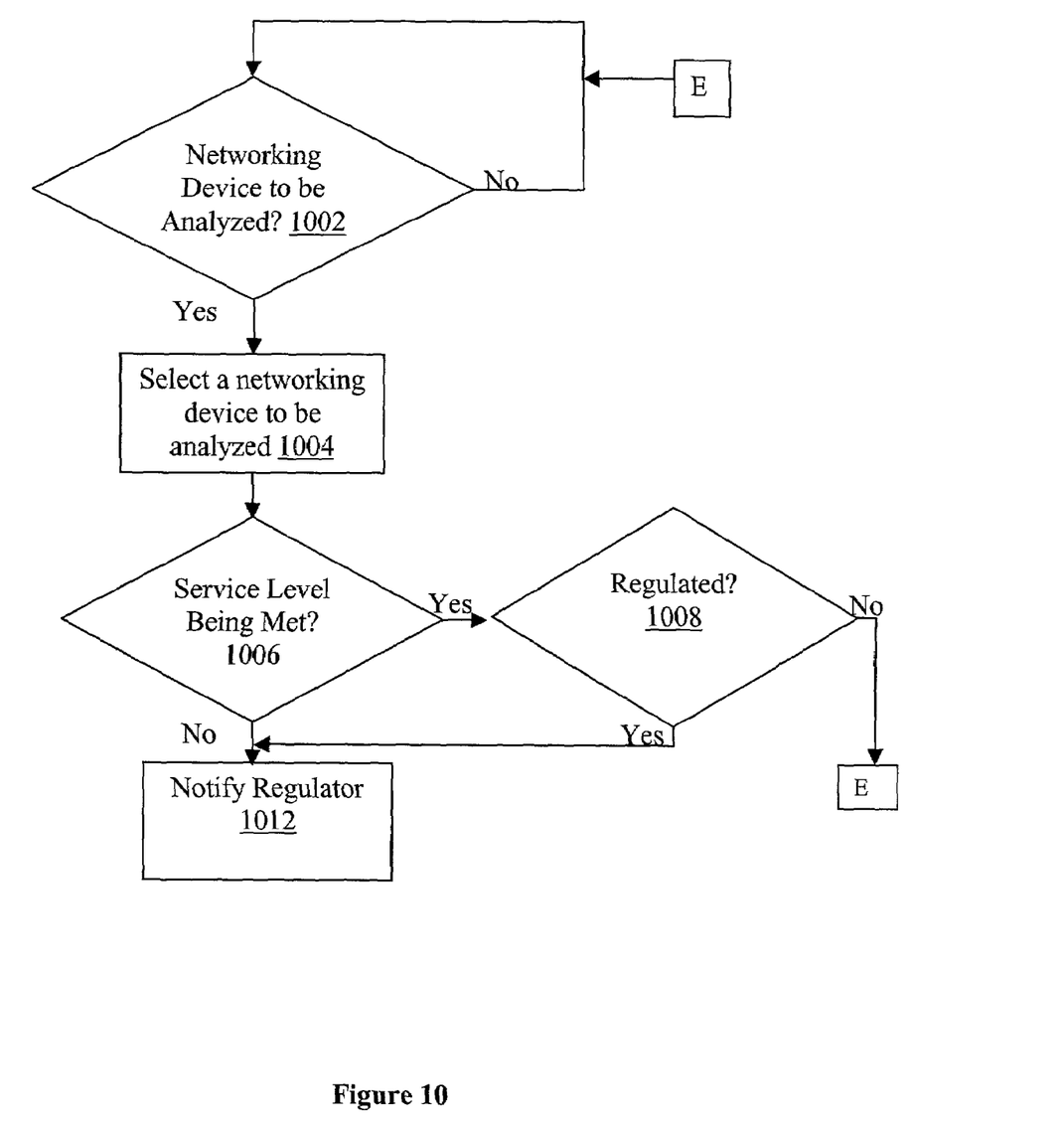
Figure 11:
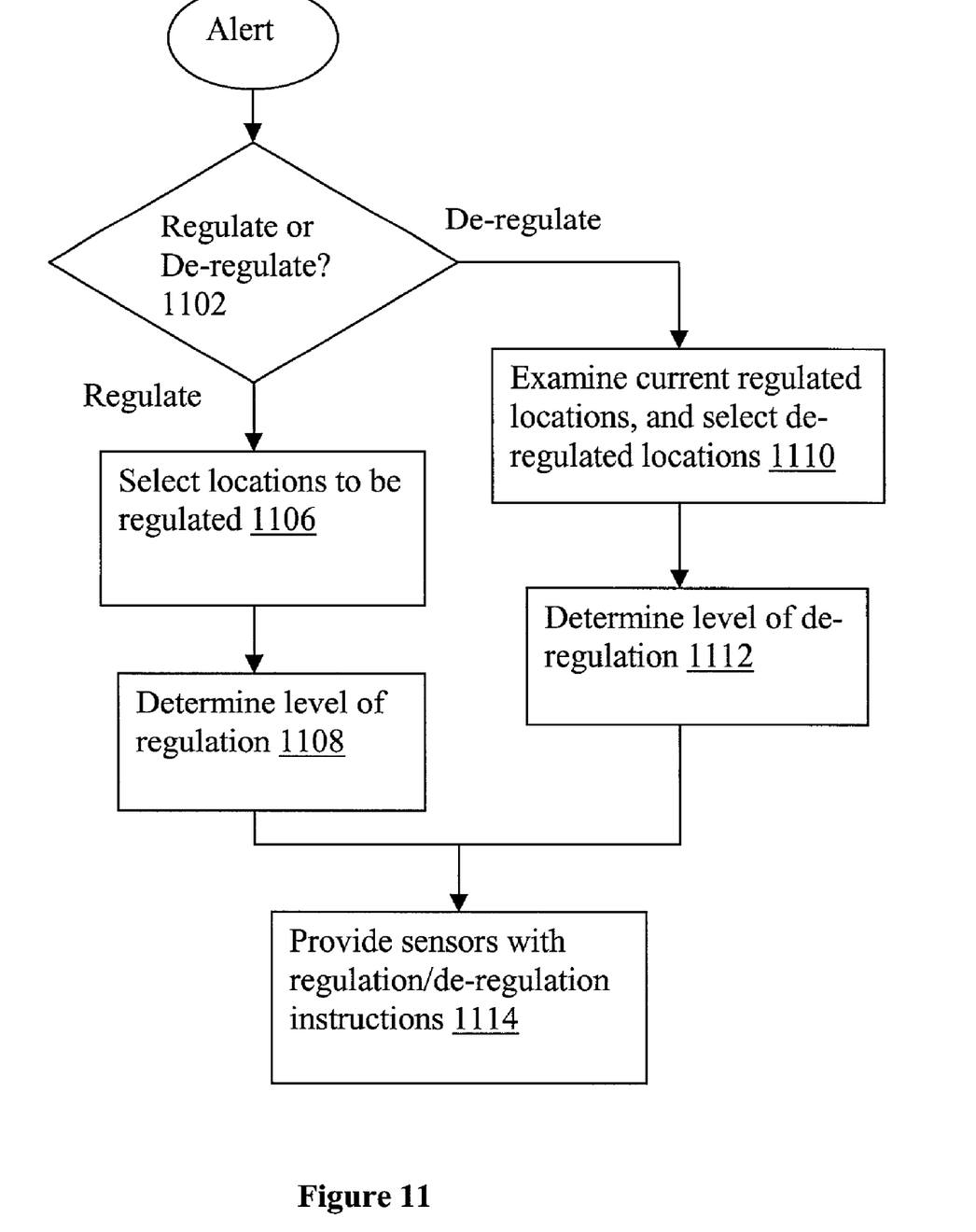

FIGS. 9-10 illustrate the operational flow of the relevant aspects of the send/receive, analyzer and regulation functions 802-806, in accordance with one embodiment each. As illustrated in FIG. 9, for the send/receive function, upon start up, it determines if there are network traffic data to be received from the sensors, block 902. If there are, send/receive function 802 receives the network traffic data being reported accordingly. If there are not, send/receive function 802 determines if there are regulation/de-regulation instructions to be sent to the sensors. If there are, send/receive function 802 sends the regulation/regulation instructions accordingly. If there are not, send/receive function 802 returns to block 902 to determine if there are data to be received again.

As illustrated in FIG. 10, upon start up, analyzer 804 determines if there are networking devices to be analyzed, block 1002. If there are not, it awaits for the "enrollment" of a networking device of interest. If there are, analyzer 804 selects a networking device to be analyzed, block 1004. Analyzer 804 first determines if the networking device is meeting its service level goals/commitments, block 1006. If the networking device is meeting its service level goals/commitments, analyzer 804 further determines if regulation of a group of other network traffics are currently being administered on behalf of the networking device to enhance its ability to meet the service level goals/commitments, block 1008. If either the networking device is not meeting its service level goals/commitments, and at least one other group of network traffic is contributing to the non-meeting of the service level goals/commitments, or the networking device is consistently meeting its service level goals/commitments, and regulation is being administered on its behalf, analyzer 804 notifies regulator 806 accordingly.

As illustrated in FIG. 11, upon receipt of an alert, regulator 806 determines if the alert is for regulation or de-regulation, block 1102. If the alert is for regulation, regulator 806 selects the locations to be regulated, block 1106. Further, regulator 806 also determines the level of regulation, e.g. how much bandwidth to reduce, or how many priority levels to drop, with respect to the target network traffic, block 1108. In one embodiment, the moderations are made in pre-determined small quantities and iteratively increased. Upon making these determinations, regulator 806 provides the appropriate sensor functions (or the routers directly) with the regulation/de-regulation instructions accordingly, block 1114. In alternate embodiments, the amount of moderations may be determined through the employment of predictive models. On the other hand, if the alert is for de-regulation, regulator 806 selects the "outermost" regulated routers for de-regulation, block 1110. Further, regulator 806 determines the level of de-regulation, e.g. how much bandwidth to increase, or how many priority levels to bump up, block 1112. Similarly, the relaxations are made in pre-determined small quantities and iteratively increased, or in alternate embodiments, in accordance with selected predictive models. Upon making these determinations, regulator 806 provides the appropriate sensor functions (or the routers directly) with the regulation/de-regulation instructions accordingly, block 1114.

Example Host Computer System

Figure 12:
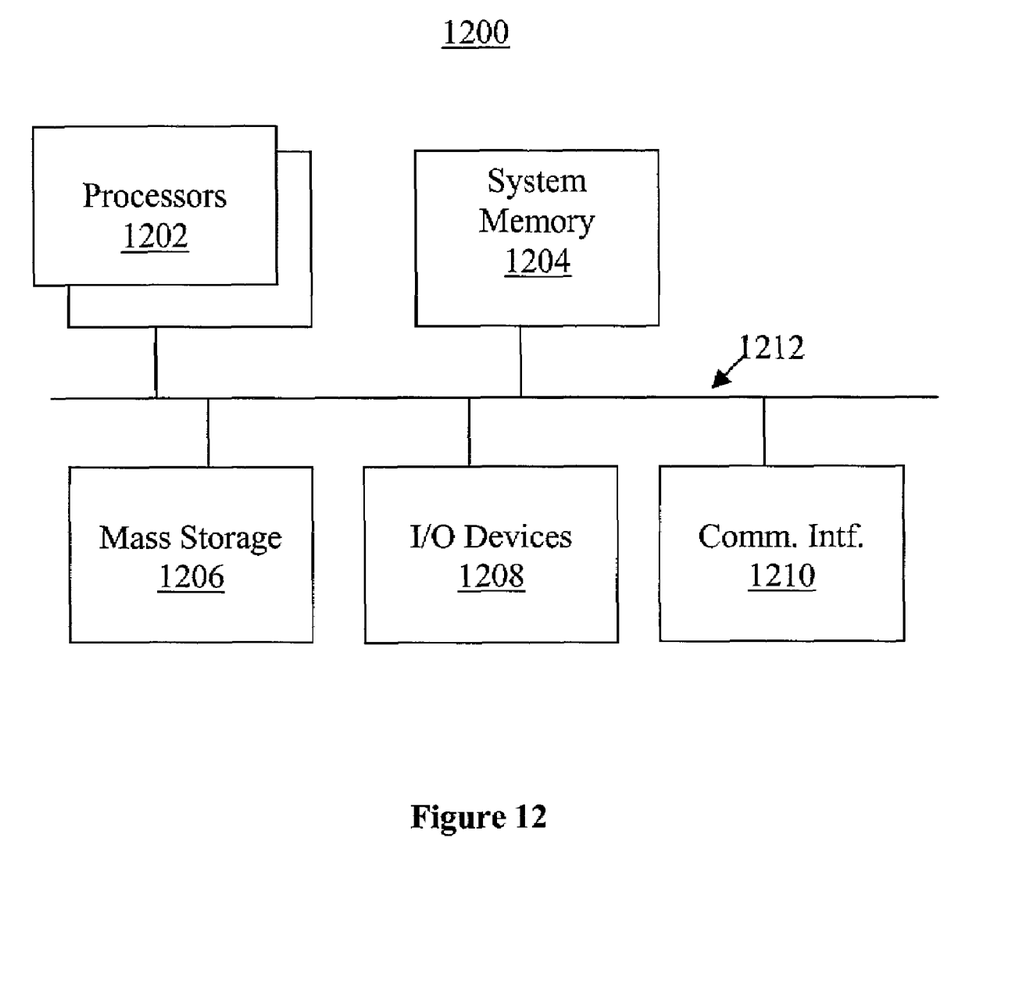
FIG. 12 illustrates an example computer system suitable for use to host a software implementation of the sensor or the director function, in accordance with one embodiment.

FIG. 12 illustrates an example computer system suitable for use as either a host to a software implementation of a sensor, or the director in accordance with one embodiment. As shown, computer system 1200 includes one or more processors 1202 (typically depending on whether it is used as host to sensor or the director), and system memory 1204. Additionally, computer system 1200 includes mass storage devices 1206 (such as diskette, hard drive, CDROM and so forth), input/output devices 1208 (such as keyboard, cursor control and so forth) and communication interfaces 1210 (such as network interface cards, modems and so forth). The elements are coupled to each other via system bus 1212, which represents one or more buses. In the case of multiple buses, they are bridged by one or more bus bridges (not shown). Each of these elements perform its conventional functions known in the art. In particular, system memory 1504 and mass storage 1506 are employed to store a working copy and a permanent copy of the programming instructions implementing the teachings of the present invention. The permanent copy of the programming instructions may be loaded into mass storage 1206 in the factory, or in the field, as described earlier, through a distribution medium (not shown) or through communication interface 1210 (from a distribution server (not shown). The constitution of these elements 1202-1212 are known, and accordingly will not be further described.

CONCLUSION AND EPILOGUE

Thus, it can be seen from the above descriptions, a novel method and apparatus for distributively managing service level commitments has been described. The novel scheme enables the quality of service provided by a networking device to be ensured, including nullification of denial of service attacks, without imposing the burden of management on the networking device itself.

While the present invention has been described in terms of the above illustrated embodiments, those skilled in the art will recognize that the invention is not limited to the embodiments described. The present invention can be practiced with modification and alteration within the spirit and scope of the appended claims. For examples, as alluded to earlier, the present invention may be practiced with more or less sensors, more directors, and so forth. Further, regulations may be applied or relaxed in response to the assumption of additional or removal of service level goals/commitments by the networking device of interest. Alternatively, as opposed to causing regulations to be automatically applied or relaxed, at least some of the regulation/de-regulation may be suggested to a networking administrator instead.

Thus, the description is thus to be regarded as illustrative instead of restrictive on the present invention.

What is claimed is:

1. A method comprising:
   determining by a first network management device, separate and distinct from a first router of a network, whether the first router is meeting a service level for a first group of network traffic of the network serviced by the first router; and
   regulating a second group of network traffic of the network, also being serviced by said first router, by blocking the second group to assist the first router in meeting the service level for the first group of network traffic and nullify a denial of service attack involving the first router, the second group of network traffic being separate and distinct from said first group of network traffic;
   wherein said first group of network traffic comprises network traffic destined for/sourced from first one or more network nodes of said network, and said second group of network traffic comprises network traffic destined for/sourced from second one or more network nodes of said network that are separate and distinct from said first one or more network nodes.

2. The method of claim 1, wherein said method further comprises monitoring one or more network traffic metrics associated with said first group of network traffic that are at least partially indicative of whether the first router is meeting said service level for said first group of network traffic.

3. The method of claim 2, wherein said service level comprises a selected one of a reliability service level and a performance service level.

4. The method of claim 2, wherein said monitoring is performed at said first networking device.

5. The method of claim 2, wherein said monitoring is performed away from said first networking device.

6. The method of claim 1, wherein said method further comprises determining by a second network management device, away from said first router, whether said second group of network traffic substantially contributes to said first router's non-meeting of said service level for said first group of network traffic, and said regulating of said second group of network traffic is conditionally performed, upon determining said second group of network traffic substantially contributes to said first router is not meeting of said service level for said first group of network traffic.

7. The method of claim 6, wherein said first and second network management devices are separate and distinct network management devices.

8. The method of claim 6, wherein said first and second network management devices are the same network management device.

9. The method of claim 1, wherein said service level is a selected one of a service level goal and a service level commitment of said first router for said first group of network traffic of the network serviced by said first router.

10. The method of claim 1, wherein said first group of network traffic comprises network traffic destined for/sourced from a first client of a first network node of said network, and said second group of network traffic comprises network traffic destined for/sourced from a second client of the same first network node of said network.

11. The method of claim 1, wherein said method further comprises determining by a second network management device, away from said first router, where said regulating is to be performed.

12. The method of claim 1, wherein said regulating comprises regulating said first router with respect to services provided by said first router to said second group of network traffic.

13. The method of claim 1, wherein said regulating comprises regulating a second router of said network with respect to services provided by said second router to said second group of network traffic.

14. The method of claim 1, wherein said method further comprises determining by a second network management device, whether said second group of network traffic are being regulated, and if said second group of network traffic are being regulated, whether the regulation is to be moderated.

15. The method of claim 1, wherein said method further comprises:
   monitoring packet drop rate associated with said first group of network traffic; and
   determining whether the first router is meeting said service level for said first group of network traffic based on the packet drop rate.

16. The method of claim 1, wherein said method further comprises:
   monitoring a volume of data transmitted by the first router; and
   determining whether the first router is meeting said service level for said first group of network traffic based on the volume.

17. The method of claim 1, wherein said method further comprises:
   monitoring an average turn-around time of packets transmitted by the first router; and
   determining whether the first router is meeting said service level for said first group of network traffic based on the average turn-around time of the packets.

18. A method comprising:
- determining by a network management device, separate and distinct from a router of a network, whether the router is meeting a service level for a first group of network traffic of the network serviced by the router;
- regulating a second group of network traffic of the network, also being serviced by said router, by blocking the second group to assist the router in meeting the service level for the first group of network traffic and nullify a denial of service attack involving the router, the second group of network traffic being separate and distinct from said first group of network traffic;
- determining by a second network management device, away from said router, whether said second group of network traffic substantially contributes to said router's non-meeting of said service level for said first group of network traffic, and said regulating of said second group of network traffic is conditionally performed, upon determining said second group of network traffic substantially contributes to said router not meeting of said service level for said first group of network traffic; and
- determining by the second network management device, whether said second group of network traffic are being regulated, and if said second group of network traffic are being regulated, whether the regulation is to be moderated to unblock the second group.

19. A system comprising:
- a managed networking device transmitting network traffic to and from other networking devices;
- a sensor, located away from a managed networking device, that determines whether the managed networking device is meeting a service level for a first group of the network traffic serviced by the managed networking device by monitoring a packet drop rate associated with said first group of network traffic;
- a director, located away from a managed networking device, that determines whether a second group of network traffic substantially contributes to said managed networking device failure to meet the said service level for said first group of network traffic, the second group of network traffic being also serviced by the managed networking device, but separate and distinct from said first group of network traffic, wherein said first group of network traffic comprises network traffic destined for/sourced from first one or more network nodes of said network, and said second group of network traffic comprises network traffic destined for/sourced from second one or more network nodes of said network that are separate and distinct from said first one or more network nodes, wherein the director regulates the second group of network traffic of the network by signaling the second networking device to block the second group of network traffic to assist the managed networking device in meeting the service level for the first group of network traffic and nullify a denial of service attack involving the managed networking device, if said second group of network traffic is determined to substantially contribute to a failure to meet the service level for said first group of network traffic.

\* \* \* \* \*